(No Model.)
D. D. PALMER.
APPARATUS FOR DRILLING DIAMONDS AND EXCESSIVELY HARD SUBSTANCES.
No. 463,973.    Patented Nov. 24, 1891.
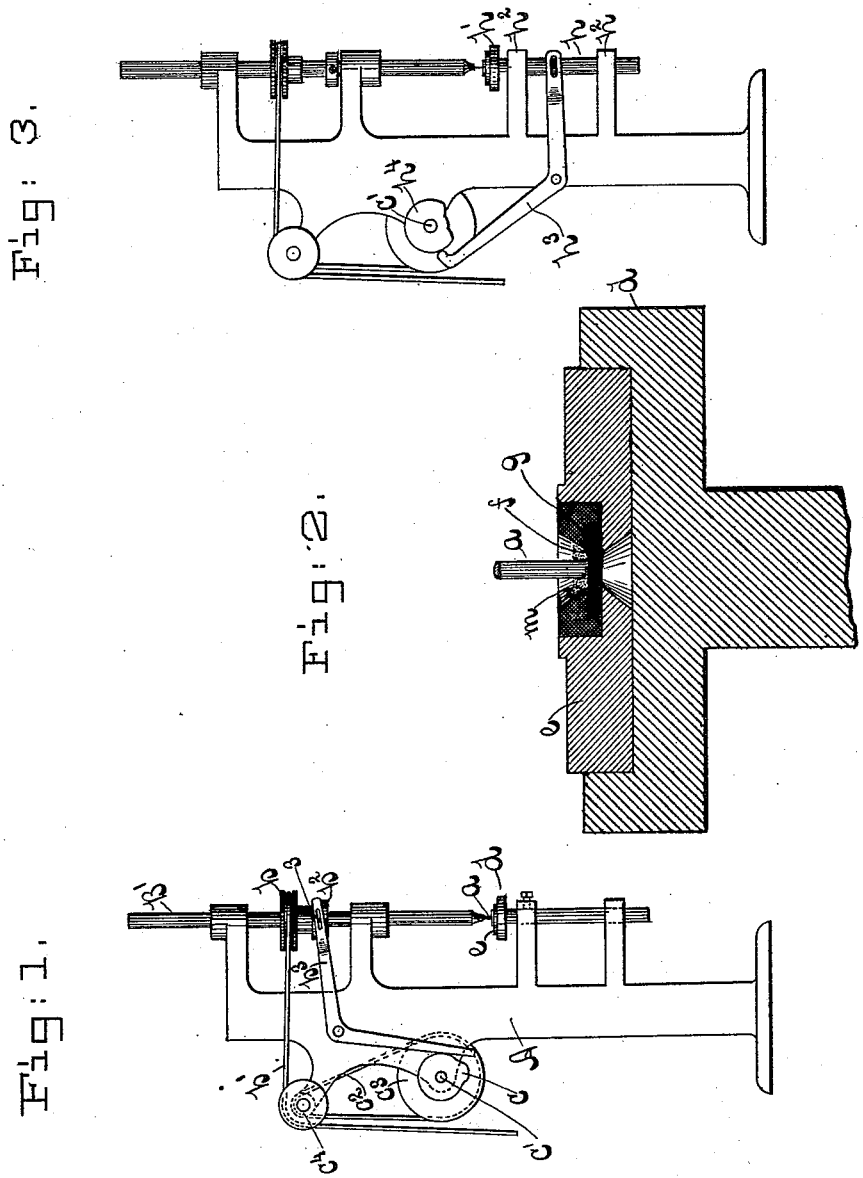
Witnesses:
Edward F. Allen
Oscar F. Hill
Inventor.
Dotphas D. Palmer
By Crosby & Gregory Attys.

UNITED STATES PATENT OFFICE.

DOLPHAS D. PALMER, OF WALTHAM, ASSIGNOR TO THE WASHBURN & MOEN MANUFACTURING COMPANY, OF WORCESTER, MASSACHUSETTS.

APPARATUS FOR DRILLING DIAMONDS AND EXCESSIVELY HARD SUBSTANCES.

SPECIFICATION forming part of Letters Patent No. 463,973, dated November 24, 1891.

Application filed May 29, 1891. Serial No. 394,472. (No model.)

*To all whom it may concern:*

Be it known that I, DOLPHAS D. PALMER, of Waltham, in the county of Middlesex, State of Massachusetts, have invented an Improvement in Apparatus for Drilling Diamonds and Excessively Hard Substances, of which the following description, in connection with the accompanying drawings, is a specification, like letters and figures on the drawings representing like parts.

In the reduction of wire by cold-drawing processes the dies are provided with very hard surfaces, and as the work is the best and the die the more lasting according to its hardness the dies have been made of rubies, black diamonds, and real diamonds. Real diamonds make the best dies, dies by means of which the wire can be the most attenuated; but the real diamonds cannot be profitably used because of the great expense and long time required in drilling them, it requiring weeks and sometimes months of the most skilled operatives.

This invention has for its object to construct an apparatus for drilling diamonds and other precious stones.

In accordance with my invention the diamond to be drilled is held in a suitable clamp and is subjected to the action of a drill, the lower end of which rotates in a small pocket in the holder, diamond dust or powder being kept between the diamond and the end of the drill. To always keep the diamond-dust under the end of the drill, the acting end of the drill and the clamp holding the diamond have a movement the one toward and from the other, the said dust getting between the drill-point and the diamond during such separation.

Figure 1 in side elevation represents a machine for drilling diamonds and other precious stones embodying this invention; Fig. 2, an enlarged detail of some of the parts to be referred to. Fig. 3 is a modification.

The frame-work A is and may be of any suitable shape to sustain the working parts.

The apparatus employed contains a spindle B' to carry the drill $a$, which preferably will be blunt, as shown enlarged in Fig. 2, the spindle having a pulley $b$ to be rotated by any usual belt $b'$ common in this class of drills and driven from any usual source. The spindle is surrounded by a loose collar $b^2$, having suitable studs 3 to enter slots or notches in the end of a lever $b^3$, acted upon by a cam $c$ on a shaft $c'$, rotated from any suitable source of power, the rotation of the said shaft, as herein represented, being effected by a belt $c^2$, extended about a pulley $c^3$ on said shaft, the said belt being represented as driven from a very much smaller pulley $c^4$ on the shaft, to which is attached one of the sheaves over which the spindle-rotating belt $b'$ runs. The lever $b^3$ and cam $c$ constitute one simple form of separating device. The apparatus shown also contains a table or rest $d$ to support the holder or die-frame $e$, in which is set and held securely the piece of diamond $f$ to be drilled, the said diamond being herein shown as laid upon a shoulder of the holder or die-frame and confined in place by lead or other suitable metal, as at $g$, the part of the diamond to be drilled being exposed in the line of the hole left through the holder, said hole being enlarged.

In Fig. 1 I have represented the bed or rest $d$ as stationary, and the spindle and drill as adapted to be rotated and reciprocated for a slight distance.

In the modification, Fig. 3, the spindle is rotated as in the plan shown in Fig. 1; but the shank $h$ of the table or rest $h'$ is mounted loosely in the bearings $h^2$ and is reciprocated slightly at intervals by the lever $h^3$, acted upon by the cam $h^4$ on a shaft $c'$ common to the apparatus shown in Fig. 1.

In accordance with my invention diamond dust or powder, as at $m$, is laid upon the diamond where it is to be drilled, (see Fig. 2,) and the cavity of the holder in which the powder or dust is placed will be of such shape as to aid powder or dust in keeping the diamond covered whenever the end of the drill is removed from contact with the diamond.

In my invention I depend upon the diamond powder or dust as the cutting medium, the blunt end of the drill being the means for pressing the powder or dust firmly against the diamond and rotating it to cut its way into the diamond. If the end of the drill were kept pressed constantly against the diamond, the powder or dust would get out from between the drill and the diamond and the drill would be unable to bore a hole; but in accordance with my invention the end of the drill and the holder containing the diamond and the diamond-dust must be made to separate slightly one from the other and then to approach one toward the other, the separation enabling the diamond-dust to be constantly supplied intermittingly under the drill and between it and the diamond, so that the grinding action of the diamond-dust on the diamond is constant while the drill is being rotated.

In my invention it is immaterial whether the drill be lifted as it is rotated or the holder be lowered from and then lifted toward the drill at suitable intervals, the separation of the drill and the diamond by a movement of one or the other being solely for the purpose of keeping a supply of the diamond-dust between the acting flat end of the drill and the diamond.

In my invention a diamond may be drilled in a very short time.

It will be obvious to those skilled in the arts that the means which may be employed to separate the drill and diamond to enable a proper amount of diamond-dust to be supplied between the drill and the diamond are of almost unlimited variety, so that my invention in so far as it relates to the apparatus used is not limited to the actuating means shown to effect the separation of the drill and the diamond in the art of drilling the diamond, nor is my invention limited to lifting the drill intermittingly, although I prefer such course.

Having described my invention, I claim as new and desire to secure by Letters Patent—

An apparatus for drilling diamonds, it comprehending a holder for the diamond to be drilled, the holder having a cavity adapted to receive diamond-dust above the diamond, a support for said holder, a rotating drill-carrying spindle, a blunt-ended drill to enter said cavity, and a separating device, whereby the end of the drill and the diamond-holder may be separated intermittingly during the drilling operation to enable particles of diamond-dust to be supplied constantly in said cavity between the end of the drill and the diamond, substantially as described.

In testimony whereof I have signed my name to this specification in the presence of two subscribing witnesses.

DOLPHAS D. PALMER.

Witnesses:
BERNICE J. NOYES,
EDWARD F. ALLEN.